Patented Mar. 16, 1943

2,313,736

UNITED STATES PATENT OFFICE 2,313,736

FLUXING COMPOSITION

Francis J. Dashner, Oak Park, Ill., assignor to American Can Company, New York, N. Y., a corporation of New Jersey No Drawing. Application November 18, 1941, Serial No. 419,659

3 Claims. (Cl. 148—25)

The present invention relates to a soldering flux for use in soldering metallic parts such as the side seams in cam bodies and has particular reference to a resin petroleum naphtha flux which possesses improved characteristics over conventional rosin or resin flux and which produces a stronger, finer grained bond when used for soldering can bodies.

The present invention contemplates the use of a special petroleum naphtha known as Stoddard solvent for the solvent phase and rosin as the active fluxing agent. Stoddard solvent is a well known petroleum distillate largely used in the dry cleaning industry and the United States Government has established certain standards and definition for this material. Reference is made to a United States Department of Commerce National Bureau of Standards publication dated June 20, 1940, under the title of Stoddard Solvent, commercial standard CS3–40.

A standard practice among can manufacturers in the use of a rosin flux for soldering can parts, such as can bodies, is to cut the rosin in alcohol. This produces a flux which is satisfactory for many purposes and which is used in some quantity. However, the alcohol is relatively expensive. It has a low boiling and flash point and this necessitates careful handling first to minimize the fire hazard during the commercial use of the flux and second to avoid waste of the fluxing material by evaporation of the solvent. Furthermore, the wetting properties of this alcohol resin flux leaves much to be desired.

A naphtha rosin flux embodying the present invention, on the other hand, possesses superior qualities as to the various features mentioned. The naphtha is more economical in its initial cost as compared to alcohol. It is more economical to use as less solder is required because of better distribution within a given joint. The naphtha having a relatively high boiling point and flash point as compared to alcohol, is a less fire hazard and it does not evaporate from the flux pot while it is being applied. This avoids waste of the fluxing material.

The special naphtha rosin flux of the present invention possesses greatly improved carrier wetting properties and this results in a considerable saving of solder. Actual commercial tests which have been run in the soldering of millions of cans show a definite saving of solder as compared with cans using the conventional alcohol rosin flux under identical conditions.

In addition to less solder, comparable tests on can body side seams produced under identical conditions show that the soldered joint made with the naphtha rosin flux is from two to four times stronger. It is believed that this is due in large part to the improved wetting properties imparted to the flux by the naphtha resulting in a better solder flow and improved adhesion of the solder in the joint.

An object of the invention is the provision of an improved rosin flux for use in soldering metallic surfaces wherein the petroleum naphtha solvent known as Stoddard solvent is combined with rosin in such a manner as to produce a soldering flux possessing greatly improved characteristics.

Another object is the provision of an improved soldering flux wherein the solvent phase has a relatively high flash point, thus eliminating fire hazards but also permitting its complete evaporation during the regular soldering operation so that there is no danger of contamination of the food contents in cans containing such product and, therefore, no off-tastes are imparted by reason of flux contamination.

Yet another object is the provision of such a flux which when used for soldering seams in metallic cans such as are made from tin coated plate, or from uncoated steel plate provides a soldered joint in which the solder is more uniform in appearance, has better distribution and a finer grain structure with attendant improved adhesion which it would appear is the result of greater solvent wetting action on the plate.

Numerous other objects and advantages of the invention will be apparent as it is better understood from the following description which is of a preferred embodiment thereof.

The Stoddard solvent used in providing the soldering flux of the present invention has an initial boiling point in the neighborhood of 300° F. and an end point of 420° F. In other words actual tests have shown that not more than 5 percent of the petroleum naphtha distills over below 300° F. and not less than 95 percent distills over at or below 420° F. This means that higher soldering temperatures can be used in soldering cans with the improved flux and a better wiping action is made available to the can manufacture by such a use.

The relatively high initial boiling point which means slower evaporation while in the flux pot, maintains the fluxing material in more workable form over extended time intervals and accordingly improves the commercial operation of large scale soldering of cans.

The rosin used in making the flux of the present invention may be of the usual quality as used in making the conventional alcohol rosin flux. The rosin is a natural resin although some rosin derivatives may function equally well. The size of the rosin lumps is immaterial, the actual cutting of the rosin in the naphtha being carried out in any suitable manner to insure that the rosin is completely dissolved. Obviously a powdered rosin will require less time to dissolve than where lumps are present, but in making the flux preparation it is not necessary nor is it desirable to grind or powder the rosin.

Substantially seven pounds of the conventional grade of rosin are completely soluble in one gallon of the Stoddard solvent. However, such a large rosin content is too concentrated for flux purposes in can soldering and is not used. A range of rosin amounts for flux uses is from ¼ pound to five pounds of rosin cut in one gallon of the naphtha.

While the exact manner of cutting the rosin in the naphtha is not critical, the following example is given for preparing a rosin naphtha flux suitable for use in soldering side seams of metallic can bodies. It will be understood that this is but one method of procedure and any other manner of preparing the flux which insures solution of the rosin is satisfactory and is within the scope of the present invention.

A large metal tank is used for the mixing of the materials. Such a tank preferably is fitted with a spigot located in the tank wall about two inches from the bottom. The desired quantity of rosin is weighed and put in the tank. This rosin may be in lump form, as previously suggested, it being customary to use the rosin as it is received.

The proper volume of Stoddard solvent is then added. A conventional formula largely used is one pound of rosin for each gallon of naphtha. Occasional stirring with a wooden paddle is necessary to produce the best results. A short stirring period every two hours is satisfactory. With such a stirring procedure the total dissolving time will require approximately 24 hours. This time may be shortened by a more vigorous stirring procedure.

When the rosin has been dissolved completely, the mixture is run off through the spigot into a fine wire screen funnel. All suspended insoluble materials are caught on the screen. Some heavy foreign matter may have settled in the tank and fails to flow through the spigot. The filtered rosin naphtha flux is now ready for use. Such a flux possesses the desirable characteristics as has already been fully explained and cans which are soldered by use of such a flux have stronger seams of improved appearance.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

I claim:

1. A liquid rosin flux composition for soldering the seams of can bodies and the like, having improved wetting and solder disseminating characteristics, comprising a resinous material dissolved in a petroleum naphtha solvent as a carrying vehicle.

2. A liquid rosin flux composition for soldering the seams of can bodies and the like, having improved wetting and solder disseminating characteristics, comprising a rosin dissolved in a Stoddard solvent as a carrying vehicle.

3. A liquid rosin flux composition for soldering the seams of can bodies and the like, having improved wetting and solder disseminating characteristics, comprising a solution of rosin and Stoddard solvent as a carrying vehicle in the proportions of from ¼ to 5 pounds of rosin for each gallon of the solvent.

FRANCIS J. DASHNER.